US011297348B2

(12) United States Patent
Chiang et al.

(10) Patent No.: US 11,297,348 B2
(45) Date of Patent: Apr. 5, 2022

(54) IMPLICIT TRANSFORM SETTINGS FOR CODING A BLOCK OF PIXELS

(71) Applicant: MediaTek Inc., Hsinchu (TW)

(72) Inventors: Man-Shu Chiang, Hsinchu (TW); Chun-Chia Chen, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/382,167

(22) Filed: Apr. 11, 2019

(65) Prior Publication Data

US 2019/0320203 A1 Oct. 17, 2019

Related U.S. Application Data

(60) Provisional application No. 62/657,100, filed on Apr. 13, 2018.

(51) Int. Cl.
*H04N 19/61* (2014.01)
*H04N 19/159* (2014.01)
*H04N 19/137* (2014.01)
*H04N 19/176* (2014.01)
*H04N 19/132* (2014.01)
*H04N 19/196* (2014.01)
*H04N 19/46* (2014.01)
(Continued)

(52) U.S. Cl.
CPC .......... *H04N 19/61* (2014.11); *H04N 19/119* (2014.11); *H04N 19/132* (2014.11); *H04N 19/137* (2014.11); *H04N 19/159* (2014.11); *H04N 19/176* (2014.11); *H04N 19/196* (2014.11); *H04N 19/46* (2014.11); *H04N 19/52* (2014.11); *H04N 19/521* (2014.11)

(58) Field of Classification Search
None
See application file for complete search history.

(56) References Cited

U.S. PATENT DOCUMENTS 10,419,754 B1 * 9/2019 Zhao .................... H04N 19/11
2010/0118947 A1 5/2010 Goetting
(Continued)

FOREIGN PATENT DOCUMENTS

| EP | 1768421 A2 | 3/2007 |
| EP | 2942957 A1 | 11/2015 |
| WO | WO 2018064517 A1 | 4/2018 |

OTHER PUBLICATIONS

Taiwan Intellectual Property Office, Office Action for Taiwan Patent Application No. 108112955, dated Feb. 7, 2020.
(Continued)

*Primary Examiner* — Edemio Navas, Jr.
(74) *Attorney, Agent, or Firm* — Oblon, McClelland, Maier & Neustadt, L.L.P.

(57) ABSTRACT

A video coder that implicitly signals a transform setting for coding a block of pixels is provided. The video coder derives a transform setting for a block of pixels based on a block processing setting. The video coder processes the block of pixels according to the block processing setting. For encoding, the video coder transforms a set of residual pixels to generate a set of transform coefficients according to the transform setting. For decoding, the video coder inverse transforms the transform coefficients to generate a set of residual pixels according to the transform setting.

21 Claims, 12 Drawing Sheets

(51) Int. Cl.
*H04N 19/513* (2014.01)
*H04N 19/52* (2014.01)
*H04N 19/119* (2014.01)

(56) References Cited

U.S. PATENT DOCUMENTS

| | | |
|---|---|---|
| 2011/0090952 A1 | 4/2011 | Cohen et al. |
| 2012/0057630 A1 | 3/2012 | Saxena et al. |
| 2012/0250765 A1 | 10/2012 | Wu et al. |
| 2013/0034153 A1* | 2/2013 | Song .................. H04N 19/176 375/240.03 |
| 2016/0219278 A1* | 7/2016 | Chen ...................... H04N 19/56 |
| 2017/0223352 A1* | 8/2017 | Kim ........................ H04N 19/13 |
| 2017/0366824 A1* | 12/2017 | Hsu ......................... H04N 19/46 |
| 2019/0238880 A1* | 8/2019 | Lee ....................... H04N 19/147 |
| 2019/0246134 A1* | 8/2019 | Abe ...................... H04N 19/139 |
| 2019/0281321 A1* | 9/2019 | Zhao ...................... H04N 19/12 |

OTHER PUBLICATIONS

China Natinoal Intellectual Property Administration, International Search Report and Written Opinion for International Patent Application No. PCT/CN2019/082545, dated Jul. 10, 2019.
Taiwan Intellectual Property Office, Office Action for Taiwan Patent Application No. 108112931, dated Mar. 13, 2020.

\* cited by examiner

IMPLICIT TRANSFORM SETTINGS FOR CODING A BLOCK OF PIXELS

CROSS REFERENCE TO RELATED PATENT APPLICATION(S)

The present disclosure is part of a non-provisional application that claims the priority benefit of U.S. Provisional Patent Application No. 62/657,100, filed on 13 Apr. 2018. Contents of above-listed application(s) are herein incorporated by reference.

TECHNICAL FIELD

The present disclosure relates generally to video processing. In particular, the present disclosure relates to implicit signaling of transform settings.

BACKGROUND

Unless otherwise indicated herein, approaches described in this section are not prior art to the claims listed below and are not admitted as prior art by inclusion in this section.

High-Efficiency Video Coding (HEVC) is a new international video coding standard developed by the Joint Collaborative Team on Video Coding (JCT-VC). HEVC is based on the hybrid block-based motion-compensated Discrete Cosine Transform (DCT) coding architecture. The basic unit for compression, termed coding unit (CU), is a 2N×2N square block, and each CU can be recursively split into four smaller CUs until the predefined minimum size is reached. Each CU contains one or multiple prediction units (PUs). For each PU, either Intra Prediction or Inter Prediction can be used. While temporal reconstructed reference frames are used for predictions in Inter Prediction modes, spatial reconstructed pixels within the same frame are used for Intra Prediction modes. After prediction, the predicted residues for one CU are divided into transform units (TUs) and coded using transform and quantization. Like many other precedent standards, HEVC adopts Discrete Cosine Transform type II (DCT-II) as its core transform because it has a strong "energy compaction" property.

To achieve the best coding efficiency of hybrid coding architecture in HEVC, for inter prediction modes, there are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set, which includes two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coder that implicitly signals a transform setting for coding a block of pixels. The video coder derives a transform setting for a block of pixels based on a block processing setting. The video coder processes the block of pixels according to the block processing setting. For encoding, the video coder transforms a set of residual pixels to generate a set of transform coefficients according to the transform setting. For decoding, the video coder inverse transforms the transform coefficients to generate a set of residual pixels according to the transform setting.

In some embodiments, the transform setting includes a target transform mode that is selected from a plurality of candidate transform modes based on the block processing setting for the block of pixel. In some embodiments, a target transform group is selected from at least one first group and at least one second group based on a transform flag, the plurality of candidate transform modes belongs to either the first group or the second group, the target transform mode is selected from the candidate transform modes belonging to the target transform group. In some embodiments, the transform flag is parsed from the bitstream or determined according to the block processing setting. In some other embodiments, the target transform mode is determined according to an index derived from the bitstream or the block processing setting. In some other embodiments, at least one of the candidate transform modes comprises a transform type for horizontal transform and a transform type for vertical transform. In some other embodiments, the transform setting is not included in the bitstream as a syntax element. In some embodiments, the transform flag and/or the transform index are not signaled in the bitstream as a syntax element but are derived from the block processing settings.

In some embodiments, the block processing setting controls a Generalized Bi-prediction (GBi) operation that applies different weights for different predictors when producing the set of prediction pixels. The block processing setting includes a weight selection index for selecting a weight for a predictor. The video coder derives the transform setting by selecting a transform mode from a plurality of transform modes based on the weight selection index.

In some embodiments, the block processing setting controls a Local Illumination Compensation (LIC) operation that uses neighboring samples of the block of pixels and neighboring samples of a reference block of pixels to apply an illumination adjustment to the block of pixels. The block processing setting comprises a LIC flag for enabling the LIC operation. The video coder derives the transform setting by selecting a transform mode from a plurality of transform modes based on the LIC flag.

In some embodiments, the block processing setting controls an inter-prediction operation. The block processing setting comprises an Advance Motion Vector Resolution (AMVR) operation that switches a resolution of a motion vector difference between a motion vector and a motion predictor of the block of pixels with a resolution selection index for selecting a resolution for the motion vector difference. The video coder derives the transform setting by selecting a transform mode from a plurality of transform modes based on the resolution selection index.

In some embodiments, the block processing setting controls an Overlapped Block Motion Compensation (OBMC) operation for smoothing boundaries between partitions of the block of pixels using different motion vectors. The block processing setting includes an OBMC flag for enabling the OBMC operation. The video coder derives the transform setting by selecting a transform mode from a plurality of transform modes based on the OBMC flag.

In some embodiments, the block processing setting controls an inter-prediction operation. The block processing setting comprises a merge candidate index that selects one of a set of one or more Merge candidates. The video coder derives the transform setting by selecting a transform mode from a plurality of transform modes based on the merge index.

In some embodiments, the block processing setting includes a prediction direction of a motion candidate. The video coder derives the transform setting by selecting a transform mode from a plurality of transform modes based on the prediction direction.

In some embodiments, the block processing setting controls a Sub-Block Transform (SBT) operation that partitions a block of pixels into a plurality of sub-blocks and performs transform for a particular sub-block in the plurality of sub-blocks. The block processing setting includes an orientation of the particular sub-block, a width or height of the particular sub-block, and a position of the particular sub-block. The video coder derives the transform setting by selecting a transform mode from a plurality of transform modes based on the block processing setting. In some embodiments, the transform setting specifies whether sub-block transform (SBT) is applied or not.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 3 illustrates Overlapped Block Motion Compensation for a 2N×N block.

FIG. 4 illustrates Overlapped Block Motion Compensation for a N×2N block.

DETAILED DESCRIPTION

Figure 1:
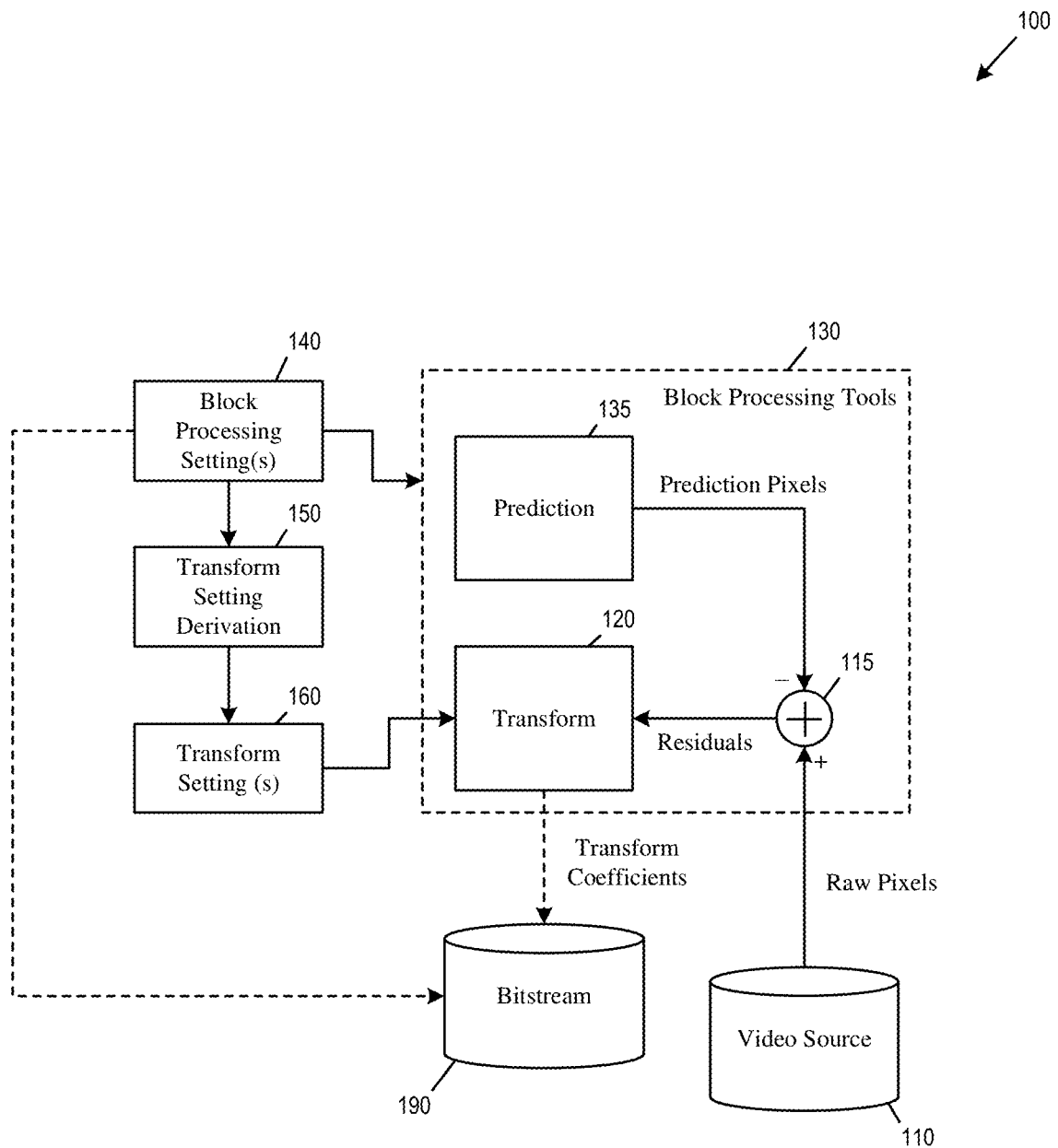
FIG. 1 conceptually illustrates implicit determination of transform settings based on block processing settings in a video encoder.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Some embodiments of the disclosure provide a video coder that implicitly signals transform setting(s) according to a set of predefined rules, where the video coder may mean an encoder or a decoder. The transform setting may specify a transform mode that includes a vertical transform type and horizontal transform type. Specifically, the video coder may derive the transform settings based on block processing settings in the video coder. In some embodiments, the block processing settings that are used to derive the transform settings are settings of block processing tools.

In some embodiments, an Adaptive Multiple Transform (AMT) scheme is used to define the transform settings for residual coding for both intra and inter coded blocks. AMT scheme uses transform modes selected from the DCT/DST families, including Discrete Sine Transform type VII (DST-VII), Discrete Cosine Transform type VIII (DCT-VIII), Discrete Sine Transform type I (DST-I), and Discrete Cosine Transform Type V (DCT-V). In some embodiments, a multiple transform selection (MTS) scheme is used to define the transform settings for residual coding for both intra and inter coded blocks. MTS scheme uses transform modes selected from the DCT/DST families, including Discrete Sine Transform type VII (DST-VII), Discrete Cosine Transform type VIII (DCT-VIII).

In some embodiments, multiple transform modes used in AMT scheme are divided into Transform Group 1 and Transform Group 2. The number of transform modes, including in Transform Group 1 is denoted as A, where A can be 0, 1, 2, . . . , a. The number of transform modes in Transform Group 2 is denoted as B, where B can be 0, 1, 2, ..., b. A plus B is equal to the total number of transform modes. In some embodiments, a transform mode may assign one transform type for horizontal transform and one transform type for vertical transform. (For example, DCT-II may be assigned for horizontal transform and DST-VII may be assigned for vertical transform.) In some embodiments, if A and B are both larger than 0, a transform flag is signaled to indicate the selected transform group. If the number of transform modes in the selected transform group, which is indicated by the transform flag is larger than 1, an additional transform index is signaled to indicate the selected transform mode.

In some embodiments, multiple transform modes used in MTS scheme are indicated by the transform index, which is signaled in a bitstream as syntax elements. In some embodiments, whether subblock transform (SBT) is applied or not is specified according to the transform setting. In some embodiments, implicit assignment for transform types is applied so the transform flag, or the transform index, or both the transform flag and the transform index may not be signaled. In some embodiments, the implicit assignment is used to implicitly choose Transform Group 1 or Transform Group 2 without signaling the transform flag. In some embodiments, a transform mode is implicitly determined from one particular transform group by signaling a transform flag without signaling a transform index. In some embodiments, a transform mode is implicitly determined without signaling a transform flag and a transform index.

In some embodiments, the transform settings are implicitly decided according to a pre-defined rule, such that transform flag and transform index are both implicitly determined based on block processing settings when signaling a transform mode. In some embodiments, the implicit signaling of transform settings reduces the syntax for signaling transform settings according to a pre-defined rule, such that only the transform index is implicitly determined based on block processing settings while the transform flag is explicitly signaled, or that only the transform flag is implicitly determined based on block processing settings while the transform index is explicitly signaled.

As mentioned, in some embodiments, the transform settings (e.g., transform mode) for coding a block of pixels is implicitly determined based on the block processing settings for the block of pixels. The block processing settings are for controlling the operations of block processing tools. Block processing tools encompass functions of the video coder that process the block of pixels as it is being encoded or decoded. The block processing tools may include transform and/or inverse transform functions that transform video data between frequency domain and pixel domain, inter and/or intra prediction functions that reference pixels of the same video picture or of a different picture to produce prediction pixels, or pixel filtering operations used for removing artifacts between blocks or sub-blocks. In some embodiments, the block processing settings used to derive the transform settings are encoded in a bitstream as syntax element. In some embodiments, the block processing settings used to derive the transform settings are not encoded in the bitstream.

FIG. 1 conceptually illustrates implicit determination of transform settings based on block processing settings in a video encoder 100. The figure illustrates the video encoder 100 receiving raw pixels from a video source 110. The raw pixels belong to video pictures of a video sequence. The video encoder 100 divides the raw pixels belonging to a video picture into pixel blocks (e.g., CUs) to be encoded into a bitstream 190 as syntax elements.

The video encoder 100 includes a pixel value adder 115, block processing tools 130 that includes a transform module 120 and a prediction module 135, block processing settings 140, a transform settings derivation module 150, and a set of transform settings 160. In some embodiments, the modules 120-160 are modules of software instructions being executed by one or more processing units (e.g., a processor) of a computing device or electronic apparatus. In some embodiments, the modules 120-160 are modules of hardware circuits implemented by one or more integrated circuits (ICs) of an electronic apparatus. Though the modules 120-160 are illustrated as being separate modules, some of the modules can be combined into a single module.

The pixel value adder 115 receives pixel values based on the received raw pixels and subtracts prediction pixel values from the prediction module 135 to produce residual pixel values. The pixel values processed by the pixel value adder 115 may be modified by the block processing tools 130. The residual pixel values produced by the subtraction is encoded by the transform module 120 into transform coefficients, which is further processed by the video encoder 100 to be encoded as syntax elements of the bitstream 190. The operations of the block processing tools 130 are controlled by the block processing settings 140. The operations of the transform module 120 is controlled by the transform settings 160, which are implicitly derived from the block processing settings 140 by the transform setting derivation module 150.

The transform module 120 may include multiple different transform engines, such as transform engines for DCT-II, DST-VII, DCT-VIII, DST-I, and DCT-V transform types, or any subset of the above transform types. The transform settings 160 select which transform engine is used to transform the residual values into transform coefficients for a block of pixels. The transform settings 160 also provide the parameters of the selected transform engine.

The block processing tools 130 may include engines for both intra prediction that references pixels within the current video picture and inter prediction that references pixels in temporally different video pictures (e.g., the prediction module 135). The block processing tools 130 may include multiple different prediction engines or components, such as motion estimation, motion compensation, intra-picture estimation, intra-picture prediction. The block processing tools 130 may also include other engines or components that further modify the pixels of the block. The operations of these components are controlled by the block processing settings 140. The transform module 120 and the block processing tools 130 will be described further in the context of an example video encoder by reference to FIG. 8 below.

The block processing settings 140 may be determined by a rate distortion control engine (not illustrated) of the video encoder 100. The block processing settings 140 may or may not be explicitly coded as syntax elements in the bitstream 190. On the other hand, the transform settings 160 are derived or mapped from the block processing settings 140 and not coded in the bitstream as syntax elements.

The block processing settings 140 may enable or control operations that affect the computation of the prediction pixels or residuals, operations such as Generalized Bi-prediction (GBi), Local Illumination Compensation (LIC), Advanced Motion Vector Resolution (AMVR), Overlapped Block Motion Compensation (OBMC), Sub-Block Transform (SBT), merge candidate index, merge candidate type, and motion candidate direction (List-0/List-1 uni-prediction or bi-prediction). The derivation of transform settings from block processing settings will be described in Sections I through VII below.

Figure 2:
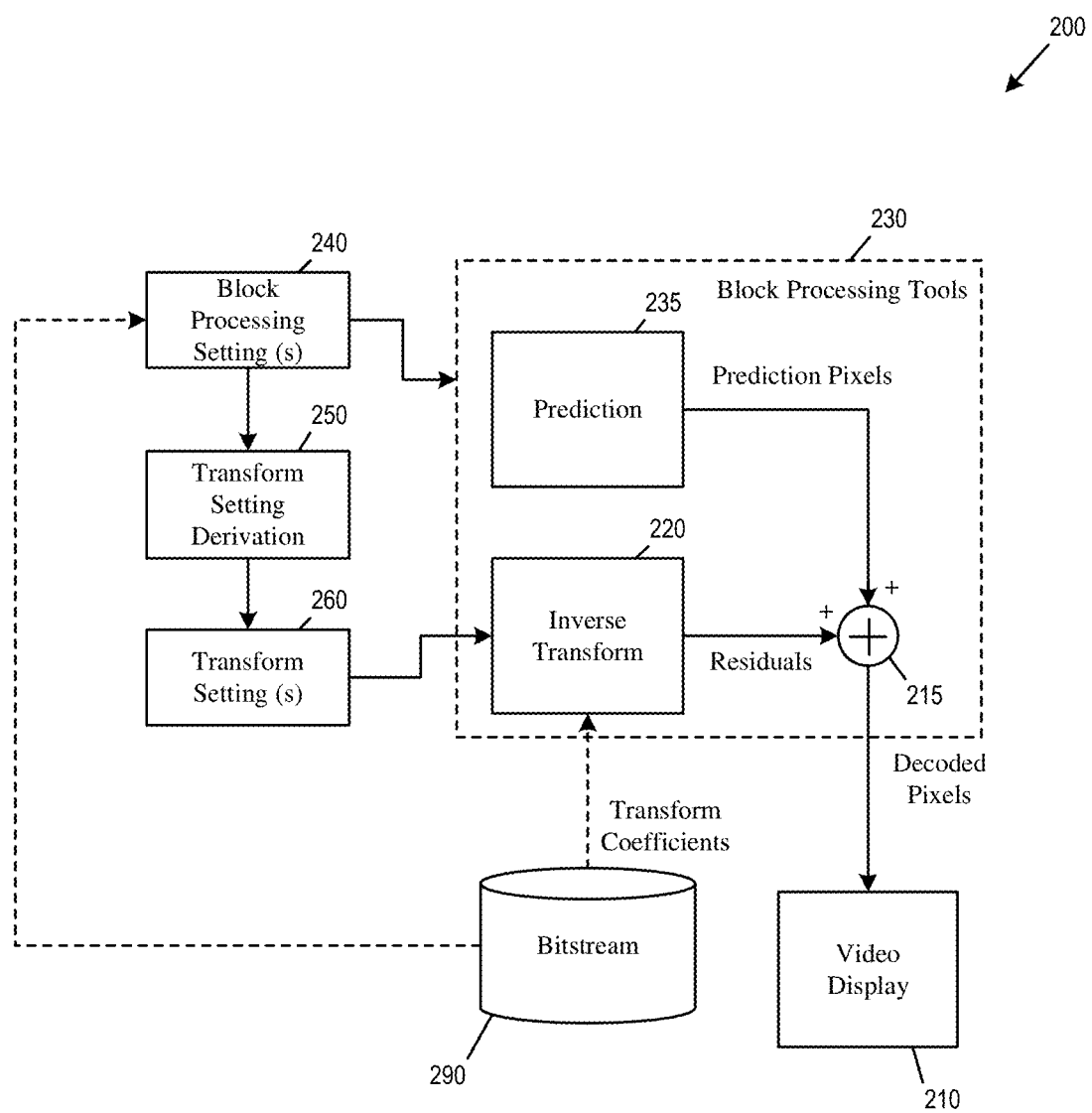
FIG. 2 conceptually illustrates implicit determination of transform settings based on block processing settings in a video decoder.

FIG. 2 conceptually illustrates implicit determination of transform settings based on block processing settings in a video decoder 200. The figure illustrates the video decoder 200 receiving syntax elements of a bitstream 290. The video decoder 200 decodes the syntax elements to reconstruct video pictures of a video sequence. The syntax elements for blocks of pixels are decoded to reconstruct the video picture for transmission or display at the video display 210.

The video decoder 200 includes a pixel value adder 215, a block processing tools 230 that includes an inverse transform module 220 and a prediction module 235, block processing settings 240, a transform settings derivation module 250, and transform settings 260. In some embodiments, the modules 215-260 are modules of software instructions being executed by one or more processing units (e.g., a processor) of a computing device or electronic apparatus. In some embodiments, the modules 215-260 are modules of hardware circuits implemented by one or more integrated circuits (ICs) of an electronic apparatus. Though the modules 215-260 are illustrated as being separate modules, some of the modules can be combined into a single module.

The inverse transform module 220 receives transform coefficients based on syntax elements from the bitstream 290. The inverse transform module 220 performs inverse transform on the transform coefficients to produce residual pixel values. The pixel value adder 215 adds the residual pixel values with the prediction pixels from the prediction module 235 to produce decoded pixels for the video display 210. The pixel values processed by the pixel value adder 215 may be further modified by the block processing tool 230. The operations of the block processing tools 230 are controlled by the block processing settings 240. The operations of the inverse transform module 220 is controlled by the transform settings 260, which are derived from the block processing settings 240 by the transform setting derivation module 250.

The inverse transform module 220 may include multiple different inverse transform engines, such as transform engines for DCT-II, DST-VII, DCT-VIII, DST-I, and DCT-V or any subset of the above transform types. The transform settings 260 select which transform engine is used to inverse transform the transform coefficients into residual pixel values for a block of pixels. The transform settings 260 also provide the parameters of the selected transform engine.

The block processing tools 230 may include engines for both intra prediction that references pixels within the current video picture and inter prediction that references pixels in temporally different video pictures (e.g., the prediction module 235). The block processing tools 230 may include multiple different prediction engines or components, such as motion compensation and intra-picture prediction. The block processing tools 230 may also include other engines or components that modify the pixels of the block. The operations of these components are controlled by the block processing settings 240. The inverse transform module 220 and the block processing tools 230 will be described further in the context of an example video decoder by reference to FIG. 11 below.

The block processing settings 240 may or may not be explicitly coded as syntax elements in the bitstream 290. The transform settings 260 are derived or mapped from the block processing settings 240 and not coded in the bitstream 290 as syntax elements.

The block processing settings may enable or control operations that affect the computation of the prediction pixels or residuals, operations such as GBi, LIC, AMVR, OBMC, and SBT, merge candidate index, merge candidate type, and motion candidate direction (List-0/List-1 uni-prediction or bi-prediction). The derivation of transform settings from block processing settings will be described in Sections I through VII below.

In some embodiments, when using block processing settings to implicitly derive transform settings, the implicit derivation may be further conditioned upon constraints such as size constraint, block shape, temporal layer, slice type, etc. In some embodiments, the implicit derivation of transform settings may be further conditioned upon explicit constraints such as a control flag(s) at slice level, picture level, etc. In some embodiments, block processing setting is mapped to or assigned to different transform modes, transform types, transform flag values, or transform indices.

I. Deriving Transform Settings Based on GBi Settings

Generalized bi-prediction (GBi) is a weighted bi-prediction technique that allows using different weights for predictors from L0 and L1, respectively, instead of using equal weights. It computes the prediction signal of a block as a weighted average of two motion-compensated prediction blocks using block-level adaptive weights, where the weight values are not restricted to 0.5. The video coder may indicate a weight value for GBi (GBi weight) by using an index (GBi index) to select a candidate weight from a set of candidate weights. Further detail for GBi can be found in the document JVET-O0047.

In some embodiments, for a block of pixels coded by AMVP mode, the implicit assignment of transform settings may be derived from settings of GBi, such as a GBi index (or weight selection index) that is used to indicate a GBi weight. Specifically, the GBi index of the block is used to derive a particular transform setting, such that different possible GBi indices are mapped to or assigned to different transform modes, transform flag values, or transform indices.

For example, one predetermined GBi index may be implicitly mapped to one predetermined transform group. The predetermined GBi index may be specified by a table with fixed entries or specified by a fixed equation {GBi index % N==n}, where N and n are predetermined integers. For example, even-number GBi indices (0, 2, . . . ) may be implicitly mapped to Transform Group 1 while odd-number GBi indices (1, 3, . . . ) may be implicitly mapped to Transform Group 2. The transform flag may not be signaled.

In some embodiments, one predetermined GBi index is implicitly mapped to one predetermined transform mode in the transform group. The predetermined GBi index may be specified by a table with fixed entries or specified by fixed equations, e.g., {GBi index % N==n}, where N and n are predetermined. For example, according to a predetermined table, when Transform Group 1 is indicated by a transform flag, even-number GBi indices (0, 2, . . . ) may be implicitly mapped to one transform mode in Transform Group 1 while odd-number GBi indices (1, 3, . . . ) may be implicitly mapped to another transform mode in Transform Group 1. Similarly, according to a predetermined table, when Transform Group 2 is indicated by a transform flag, even-number GBi indices may be implicitly mapped to one transform mode in Transform Group 2 while odd-number GBi indices may be implicitly mapped to another transform mode in Transform Group 2. The transform index may not be signaled.

In some embodiments, one predetermined GBi index is implicitly mapped to one predetermined transform mode. The predetermined GBi index may be specified by a table with fixed entries or specified by fixed equations, e.g., {GBi index % N==n}, where N and n are predetermined. For example, according to a predetermined table, even-number GBi indices may be implicitly mapped to one transform mode while odd-number GBi indices may be implicitly mapped to another transform mode. The transform flag and the transform index may not be signaled.

In some embodiments, for a block of pixels that is coded by Merge mode, the implicit mapping of transform settings may be derived from a GBi index that is inherited from the selected Merge candidate. One predetermined GBi index is implicitly mapped to one predetermined transform mode. The predetermined GBi index can be specified by a table with fixed entries or specified by fixed equations, e.g., {GBi index % N==n}, where N and n are predetermined. For example, according to a predetermined table, even-number GBi indices may be implicitly mapped to one transform mode while odd-number GBi indices may be implicitly mapped to another transform mode. The transform flag and the transform index may not be signaled.

II. Deriving Transform Settings Based on LIC Settings

Local Illumination Compensation (LIC) is a method of performing inter prediction by using neighbor samples of the current block and neighboring samples of a reference block to apply an illumination adjustment to the prediction of the current block. It is based on a linear model using a scaling factor a and an offset b. It derives the scaling factor a and the offset b by referring to the neighbor samples of current block and the neighboring samples of the reference block. Moreover, it is enabled or disabled adaptively for each CU.

In some embodiments, for a block of pixels coded by AMVP mode, the implicit assignment of transform settings may be derived from settings of LIC, such as a LIC flag that indicates whether to enabling LIC or not. For example, when the LIC flag indicates that LIC is enabled, the transform setting is set to implicitly select transform modes in Transform Group 1. When LIC flag indicates that LIC is disabled, the transform setting is set to implicitly select transform modes in Transform Group 2. The transform flag may not be signaled. In some embodiments, a transform mode specifies a horizontal transform type and a vertical transform type from a plurality of transform types In some embodiments, for a block of pixels coded by AMVP mode, when a transform flag indicates Transform Group 1, the transform setting is set to implicitly select one transform mode in Transform Group 1 according to a predetermined table if LIC is enabled. If LIC is disabled, the transform setting is set to implicitly select another transform mode in Transform Group 1 according to the predetermined table. Similarly, when a transform flag indicates Transform Group 2, the transform setting is set to implicitly select one transform mode in Transform Group 2 according to a predetermined table if LIC is enabled. If LIC is disabled, the transform setting is set to implicitly select another transform mode in Transform Group 2 according to the predetermined table. The transform index may not be signaled.

In some embodiments, for a block of pixels coded by AMVP mode, when the LIC is enabled, the transform setting is set to implicitly select one transform mode according to a predetermined table. When the LIC is disabled, the transform setting is set to implicitly select another transform mode. The transform flag and the transform index may not be signaled.

In some embodiments, for a block of pixels coded by Merge mode, the implicit assignment of transform settings may be derived from a LIC flag that is inherited from the selected Merge candidate. In some embodiments, when the LIC is enabled by the inherited LIC flag, the transform setting is set to implicitly select one transform mode according to a predetermined table. When the LIC is disabled by the inherited LIC flag, the transform setting is set to implicitly select another transform mode. The transform flag and the transform index may not be signaled.

III. Deriving Transform Settings Based on AMVR Settings

In some embodiments, the video coder uses Advanced Motion Vector Resolution (AMVR) mode to improve coding gain. AMVR adaptively switches the resolution of Motion Vector Difference (MVD). The Motion Vector Difference (MVD) (between the final MV and the MV predictor of a PU) may be coded with either quarter-pel resolution or integer-pel resolution. The switching is controlled at coding unit (CU) level, and an integer MVD resolution flag is (conditionally) signaled.

In some embodiments, for a block of pixels coded by AMVP mode, the implicit assignment of transform settings may be derived from settings of AMVR, such as an MVD resolution, which is indicated by an AMVR index (or resolution selection index). A predetermined AMVR index may be implicitly mapped to transform modes of one transform group. The predetermined AMVR index may be specified by a table with fixed entries or specified by fixed equations, e.g., {AMVR index % N==n}, where N and n are predetermined. For example, even-number AMVR indices (0, 2, . . . ) may be implicitly mapped to Transform Group 1 while odd-number AMVR indices (1, 3, . . . ) can be implicitly mapped to Transform Group 2. The transform flag may not be signaled.

In some embodiments, for a block of pixels coded by AMVP mode, a predetermined AMVR index may be implicitly mapped to one particular transform mode in the transform group. The predetermined AMVR index may be specified by a table with fixed entries or specified by fixed equations, e.g., {AMVR index % N==n}, where N and n are predetermined. For example, according to a predetermined table, when Transform Group 1 is indicated by a transform flag, even-number AMVR indices may be implicitly mapped to one transform mode in Transform Group 1 while odd-number AMVR indices may be implicitly mapped to another transform mode in Transform Group 1. Similarly, according to a predetermined table, when Transform Group 2 is indicated by a transform flag, even-number AMVR indices may be implicitly mapped to one transform mode in Transform Group 2 while odd-number AMVR indices may be implicitly mapped to another transform mode in Transform Group 2. The transform index may not be signaled.

In some embodiments, for a block of pixels coded by AMVP mode, a predetermined AMVR index may be implicitly mapped to one particular transform mode. The predetermined AMVR index can be specified by a table with fixed entries or specified by fixed equations, e.g., {AMVR index % N==n}, where N and n are predetermined. For example, according to a predetermined table, even-number AMVR indices with may be implicitly mapped to one transform mode while odd-number AMVR indices may be implicitly mapped to another transform mode. The transform flag and the transform index may not be signaled.

IV. Deriving Transform Settings Based on OBMC Settings

Overlapped Block Motion Compensation (OBMC) is used to find a Linear Minimum Mean Squared Error (LMMSE) estimate of a pixel's intensity value based on motion-compensated signals derived from motion vectors (MVs) of nearby blocks. These MVs may be regarded as different plausible hypotheses of true motion. To maximize coding efficiency, weights associated with the MVs are set to minimize the mean squared prediction error subject to the unit-gain constraint.

In some embodiments, OBMC is applied to partitions having symmetrical motions. If a coding unit (CU) is partitioned into two 2N×N (or N×2N) prediction units (PUs), OBMC is applied to the horizontal boundary of the two 2N×N prediction blocks (or the vertical boundary of the two N×2N prediction blocks). Since these partitions of the current block may have different motion vectors, the pixels at partition boundaries may have large discontinuities, which may generate visual artifacts and also reduce the transform/coding efficiency. In some embodiments, OBMC is introduced to smooth the boundaries between partitions having symmetrical motions.

Figures 3, 4:
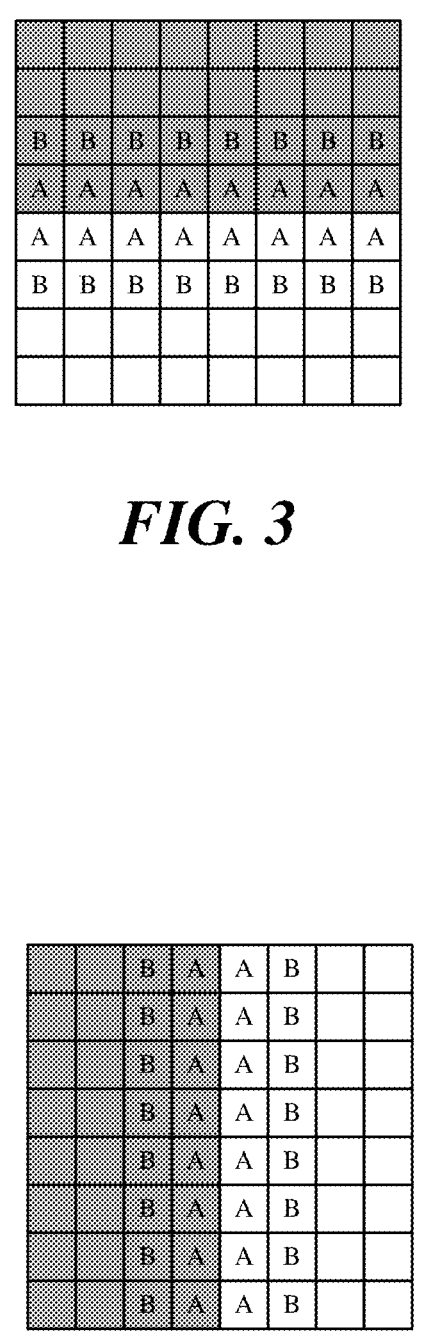

FIG. 3 illustrates OBMC for a 2N×N block and FIG. 4 illustrates OMBC for a N×2N block. The grey pixels are pixels belonging to Partition 0 and white pixels are pixels belonging to Partition 1. The overlap region in the luma component is defined as 2 rows (or columns) of pixels on each side of the horizontal (or vertical) boundary. For pixels which are one row (or one column) apart from the partition boundary, i.e., pixels labeled as A, OBMC weighting factors are (¾, ¼). For pixels which are two rows (or columns) apart from the partition boundary, i.e., pixels labeled as B, OBMC weighting factors are (⅞, ⅛). For chroma components, the overlapped region is defined as one row (or column) of pixels on each side of the horizontal (or vertical) boundary, and the weighting factors are (¾, ¼).

In some embodiments, for a block coded by AMVP mode, the implicit assignment of transform settings may be derived from settings of OBMC, such as OBMC flag that indicates whether to enable OBMC for the block or not.

For example, when the OBMC flag indicates that OBMC is enabled, the transform setting is set to implicitly select transform modes in Transform Group 1. When the OBMC flag indicates that OBMC is disabled, the transform setting is set to implicitly select transform modes in Transform Group 2. The transform flag may not be signaled.

In some embodiments, for a block of pixels coded by AMVP mode, when a transform flag indicates Transform Group 1, the transform setting is set to implicitly select one transform mode in Transform Group 1 according to a predetermined table if OBMC is enabled. If OBMC is disabled, the transform setting is set to implicitly select another transform mode in Transform Group 1 according to the predetermined table. Similarly, when a transform flag indicates Transform Group 2, the transform setting is set to implicitly select one transform mode in Transform Group 2 according to a predetermined table if OBMC is enabled. If OBMC is disabled, the transform setting is set to implicitly select another transform mode in Transform Group 2 according to the predetermined table. The transform index may not be signaled.

In some embodiments, for a block of pixels coded by AMVP mode, when the OBMC is enabled, the transform setting is set to implicitly select one transform mode according to a predetermined table. When the OBMC is disabled, the transform setting is set to implicitly select another transform mode. The transform flag and the transform index may not be signaled.

V. Transform Settings Based on Intra Mode Settings

HEVC defines 33 directional modes for intra prediction, in addition to DC and planar modes. In some embodiments, in order to improve intra prediction and to capture finer edge directions presented in natural videos, intra prediction is defined to have 65 directional modes, in addition to DC and planar modes. The denser directional intra prediction modes can be applied to all block sizes and both luma and chroma intra predictions.

Figure 5:
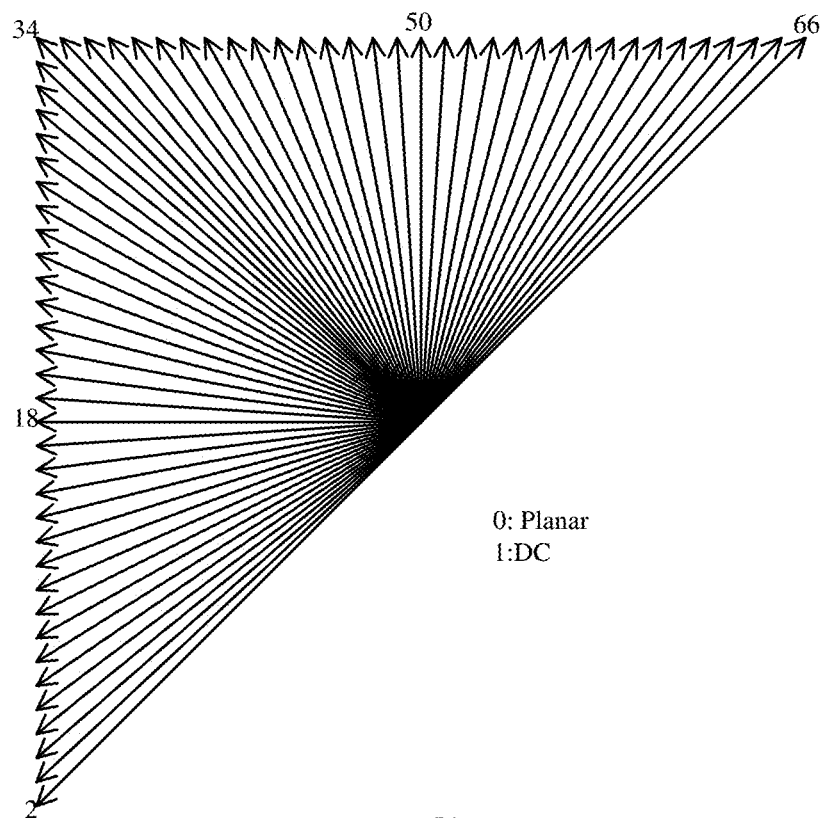
FIG. 5 illustrates the 65 directional modes of intra-prediction for coding a block of pixels.

FIG. 5 illustrates the 67 intra prediction modes for coding a block of pixels. According to the figure, intra prediction mode 0 corresponds to planar mode, intra prediction mode 1 corresponds to DC mode, and intra prediction modes 2-66 correspond to angular intra prediction modes, or directional modes. Among the directional modes, mode 2 correspond to bottom-left direction, mode 18 corresponds to Horizontal or left direction, mode 34 corresponds to Diagonal or top-left direction, mode 50 corresponds to Vertical or top direction, mode 66 corresponds to Vertical Diagonal or top-right direction.

In some embodiments, a mode-dependent transform candidate selection process is used to account for different residual statistics of different intra prediction modes. In some embodiments, each of the intra prediction directional modes are assigned a set of candidate transforms, i.e., the set of candidate transforms are selected based on the intra prediction mode. Table 1 lists three pre-defined sets of candidate transforms, each set of candidate transforms may serve as a vertical transform set or a horizontal transform set. Table 2 lists 67 intra prediction modes and their assigned sets of candidate transforms, including vertical and horizontal transform sets. When intra-predicting the block of pixels with a particular directional mode, the video coder uses table 2 to identify a set of candidate transforms based on the particular directional mode. The video coder then uses a transform index to select one transform mode from the set of candidate transforms. The transform index may be explicitly coded in a bitstream as a syntax element.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 2

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

TABLE 2-continued

Selected (H)orizontal and (V)ertical transform sets for each intra prediction mode

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

In some embodiments, the implicit assignment of transform settings may be derived from settings of intra-mode prediction. In some embodiments, according to a predetermined table, a predetermined subset of the intra directional modes may be implicitly mapped to one particular transform mode while the remaining intra directional modes outside of the subset may be implicitly mapped to another transform mode. The predetermined subset of directional modes may be specified by a table with fixed entries, e.g. {2, 18(Horizontal), 34(Diagonal), 50(Vertical), 66}. The predetermined subset may also be specified by a fixed equation, e.g. {2, 18(Horizontal), 34(Diagonal), 50(Vertical), 66}+offset, where offset can be predetermined or adaptively decided; or {directional modes % N==n}, where N and n are predetermined. The transform flag and the transform index may not be signaled.

In some embodiments, a predetermined subset of the intra directional modes may be implicitly mapped to one particular transform group while the remaining directional modes outside of the subset may be implicitly mapped to another transform group. The predetermined subset of directional modes may be specified by a table with fixed entries, e.g., {2, 18(Horizontal), 34(Diagonal), 50(Vertical), 66}. The predetermined subset may also be specified by a fixed equation, e.g., {2, 18(Horizontal), 34(Diagonal), 50(Vertical), 66}+offset, where offset can be predetermined or adaptively decided; or {directional modes % N==n}, where N and n are predetermined. The transform flag may not be signaled.

In some embodiments, when Transform Group 1 is indicated by a transform flag, a predetermined subset of the intra directional modes may be implicitly mapped to one transform mode in Transform Group 1 while the remaining directional modes outside of the subset may be implicitly mapped to another transform mode in Transform Group 1. Similarly, when Transform Group 2 is indicated by a transform flag, a predetermined subset of the intra directional modes may be implicitly mapped to one transform mode in Transform Group 2 while the remaining directional modes outside of the subset may be implicitly mapped to another transform mode in Transform Group 2. The predetermined subset of directional modes may be specified by a table with fixed entries, e.g., {2, 18(Horizontal), 34(Diagonal), 50(Vertical), 66}. The predetermined subset may also be specified by a fixed equation, e.g., {2, 18(Horizontal), 34(Diagonal), 50(Vertical), 66}+offset, where offset can be predetermined or adaptively decided; or {directional modes % N==n}, where N and n are predetermined. The transform flag may not be signaled.

In some embodiments, the assignment or mapping of intra directional modes to transform modes is further based on width and/or height of the block of pixels being transformed. For example, a predefined table or function may map intra directional modes within a certain range to a particular transform mode that specifies a vertical transform type and a horizontal transform type.

In some embodiments, the number different transform modes (or transform types) in a horizontal (or vertical) transform set may vary with the block width, or the block height, or both the block width and height, and/or the Intra prediction mode. In some embodiments, the number of different transform modes in a horizontal (or vertical) transform set may vary with the block width, or block height, or both block width and height, or Intra prediction mode. When the block height is smaller than a threshold, the transform modes in the horizontal (or vertical) transform set may be implicitly assigned according to a predetermined table. The predetermined table may depend on the block size, block shape, or the Intra prediction mode.

VI. Transform Settings Based on Inter Prediction Candidates

Figure 6:
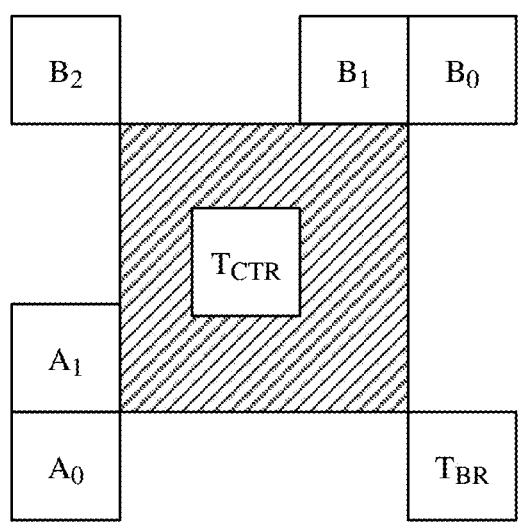
FIG. 6 illustrates a Merge candidate set of a block of pixels.

To decide the Merge index for the Skip and Merge modes, a Merge scheme is used to select a motion vector predictor among a set of Merge candidates (or merge list), which contains four spatial MVPs and one temporal MVP. FIG. 6 illustrates a set of Merge candidates for a block of pixels. As shown in FIG. 6, up to four spatial MV candidates are derived from A0, A1, B0 and B1, and one temporal MV candidate is derived from TBR or TCTR (TBR is used first, if TBR is not available, TCTR is used instead). There may be additional types of Merge candidates in set of Merge candidates, such as affine-inherited, affine-corner, spatial, temporal, middle-spatial.

In some embodiments, three types of Merge candidates are defined: spatial, temporal, and affine. Spatial type candidates include spatial candidates, middle spatial candidates, and a multi-average candidate. Temporal type candidates include temporal candidates, sub-PU type candidates (including STMVP and ATMVP), and pair-wise average candidates. Affine type candidates include spatial inherited affine candidates, middle spatial inherited affine candidates, and corner derived affine candidates. The definitions for "spatial type candidate", "temporal type candidate", "affine type candidate" may be found in document JVET-J0018.

When a CU is coded by using Merge mode, LIC flag (whether to enable LIC or not) and GBi index (to control the weight for GBi) can be inherited (copied) from neighboring blocks and OBMC is applied by default. When a CU is coded with AMVP mode, some additional syntax, such as an LIC flag, a GBi index, an AMVR index (to control MVD resolutions), and an OBMC flag (to enable OBMC) may be signaled conditionally. For AMT, multiple flags for signaling the corresponding multiple transforms may be used.

In some embodiments, for a block coded by Merge mode, when multiple transform modes and multiple Merge candidates are supported, the implicit assignment of transform settings may be derived from settings of Merge mode, such as a Merge index that is used to indicate the selected Merge candidate. For example, a predetermined subset of merge indices may be implicitly mapped to one particular transform group. The predetermined subset of Merge indices may be specified by a table with fixed entries or specified by fixed equations, e.g., {merge index % N==n}, where N and n are predetermined. For example, even-number Merge indices (0, 2, . . . ) may be implicitly mapped to transform modes of Transform Group 1 while the odd-number Merge indices (1, 3, . . . ) may be implicitly mapped to transform modes of Transform Group 2. The transform flag may not be signaled.

In some embodiments, a predetermined Merge index may be mapped to one particular transform mode in the transform group. The predetermined Merge index may be specified by a table with fixed entries or specified by fixed equations, e.g., {Merge index % N==n}, where N and n are predetermined. For example, according to a predetermined table, when Transform Group 1 is indicated by a transform flag, even-number Merge indices may be implicitly mapped to one transform mode in Transform Group 1 while odd-number Merge indices may be implicitly mapped to another transform mode in Transform Group 1. Similarly, according to a predetermined table, when Transform Group 2 is indicated by a transform flag, even-number Merge indices may be implicitly mapped to one transform mode in Transform Group 2 while odd-number Merge indices may be implicitly mapped to another transform mode in Transform Group 2. The transform index may not be signaled.

In some embodiments, a predetermined Merge index can be mapped to one particular transform mode. The predetermined Merge index may be specified by a table with fixed entries or specified by fixed equations, e.g., {merge index % N==n}, where N and n are predetermined. For example, according to a predetermined table, even-number Merge indices may be implicitly mapped to one transform mode while odd-number Merge indices may be implicitly mapped to another transform mode. The transform flag and the transform index may not be signaled. For another example, when the merge index refers to a merge candidate that uses combined inter merge and intra prediction (CIIP), the selected transform mode is inferred to be or not to be for sub-block transform (SBT). For CIIP prediction, intra prediction is added to the existing inter merge prediction. The weighted average of the inter and intra prediction signals is used to obtain the final prediction result.

In some embodiments, Merge candidates may be classified into several groups. For example, Merge candidates may be classified into two groups: Merge Group 1 (including sub-PU type candidates) and Merge Group 2 (including the remaining candidates). Merge candidates may also be classified into multiple groups such as Merge Group 1 (including spatial type candidates), Merge Group 2 (including temporal type candidates), Merge Group 3 (including affine type candidates). Merge candidates may also be classified into 11 different groups that are defined in JVET-J0018, Unified Merge List.

According to a predetermined table, the Merge candidate, which belongs to a certain group, may be implicitly mapped to a particular transform mode. In some embodiments, according to a predetermined table, different Merge candidates belonging to different groups are mapped to different transform modes. The transform flag and the transform index may not be signaled. In some embodiments, according to a predetermined table, a Merge candidate that belongs to a certain group may be implicitly mapped to different transform modes. The transform flag and the transform index may not be signaled.

In some embodiments, for a block coded by an Inter mode such as AMVP mode or Merge mode, when multiple transform modes and multiple candidates with different motion information are supported, the implicit assignment of transform setting may be based on the motion similarity of multiple candidates. The implicit assignment is according to a predetermined table. If the motion information of a first Merge candidate is sufficiently similar to that of a second Merge candidate, the first Merge candidate is implicitly mapped to one transform mode and the second Merge candidate is implicitly mapped to another transform mode. In some embodiments, If the motion information of two Merge candidates is sufficiently similar to each other, the two Merge candidates are implicitly mapped to the same transform mode. The transform flag and the transform index may not be signaled. In some embodiments, if the distance between the reference pictures of the two Merge candidates is smaller than a particular threshold, the motion information of the two candidates may be regarded to be similar. In another example, if the two Merge candidates have similar MV values and the distance between the reference pictures of the two Merge candidates is less than a particular threshold, the motion information of the two candidates may be regarded to be similar.

In some embodiments, for a block coded by AMVP mode, when multiple prediction directions such as uni-prediction (uni-directional prediction) or bi-prediction (bi-directional prediction) are supported, the implicit assignment of transform modes maybe based on prediction directions. The prediction directions can be divided into Group 1 (uni-prediction) and Group 2 (bi-prediction). According to a predetermined table, a prediction direction that belongs to a particular direction group may be implicitly mapped to one transform group or one transform mode in the transform group. The transform flag may not be signaled. In some embodiments, according to a predetermined table, a prediction direction that belongs to a certain direction group may be implicitly mapped to one transform mode. The transform flag and the transform index may not be signaled. In other words, when the direction of the prediction is bi-prediction, the transform flag may be inferred to be 0 (or 1) and transform index may be inferred to be a particular number according to a predefined table.

VII. Transform Settings Based on Sub-Block Transform

Sub-Block Transform (SBT) is a transform technique. To code a block of pixels using SBT, the block is partitioned into multiple (e.g., two) sub-blocks in vertical or horizontal orientation for conducting transformation. Transformation is performed in only one of the two sub-blocks.

In some embodiments, the transform settings of a block of pixels are implicitly derived based on the SBT settings of the block. For example, the orientation of the partitioning of the block, the position (position 0 or 1) of the sub-block that is being transformed, and/or the width/height of the sub-block being transformed may be used to determine the transform modes for horizontal transform (horTransform) and vertical transform (verTransform). In some embodiments, the position-dependent transform is applicable to luma component of the block.

Figure 7:
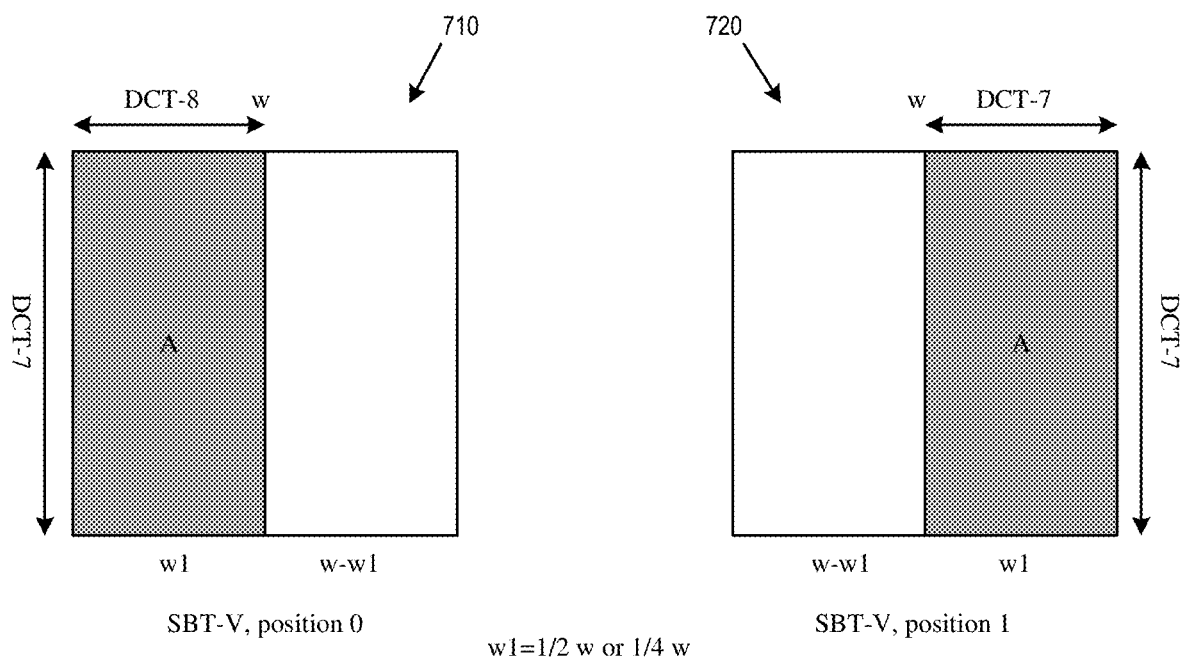
FIG. 7 illustrates blocks of pixels whose transform settings are implicitly derived from SBT settings.
Figure 7:
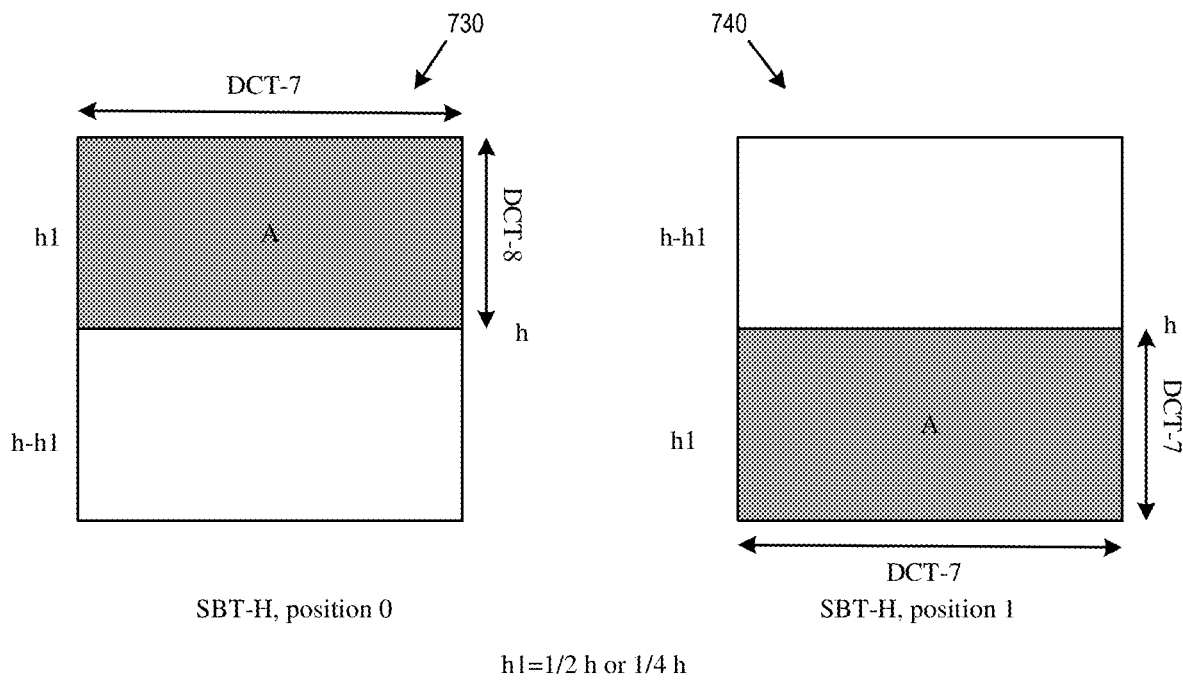

FIG. 7 illustrates blocks of pixels whose transform settings are implicitly derived from SBT settings. The figure illustrates various SBT settings in different blocks 710, 720, 730, and 740. SBT split each of the blocks into two sub-blocks. The sub-blocks for which transform is performed are illustrated as shaded and labeled with an 'A'.

The block 710 is split in vertical direction (SBT-V) into left and right sub-blocks, and transform is performed on the left sub-block (position 0) but not the right sub-block. The block 720 is split in vertical direction (SBT-V) into left and right sub-blocks, and transform is performed on right sub-block (position 1) but not the left sub-block. The block 730 is split in horizontal direction (SBT-H) into top and bottom sub-blocks, and transform is performed on top sub-block (position 0) but not the bottom sub-block. The block 740 is split in horizontal direction (SBT-H) into two sub-blocks, and transform is performed on bottom sub-block (position 1) but not the top sub-block.

When vertical split is applied (SBT-V) to a block of pixels (blocks 710 and 720), the transform settings of the block may be implicitly derived according to the following: if the sub-block height is greater than 32, then (horTransform, verTransform)=(DCT-II, DCT-II). Otherwise, if the sub-block being transformed is at position 0 (block 710), then (horTransform, verTransform)=(DCT-VIII, DST-VII). Otherwise, if the sub-block being transformed is at position is 1 (block 720), then (horTransform, verTransform)=(DST-VII, DST-VII).

When horizontal split is applied (SBT-H) to a block of pixels (blocks 730 and 740), the transform settings of the block may be implicitly derived according to the following: if the sub-block height is greater than 32, then (horTransform, verTransform)=(DCT-II, DCT-II). Otherwise, if the sub-block being transformed is at position 0 (block 730), then (horTransform, verTransform)=(DST-VII, DST-VIII). Otherwise, if the sub-block being transformed is at position is 1 (block 740), then (horTransform, verTransform)=(DST-VII, DST-VII).

The foregoing proposed method can be implemented in encoders and/or decoders. For example, the proposed method may be implemented in an inter prediction module of a video encoder, and/or an inter prediction module of a video decoder. An example video encoder will be described by reference to FIG. 8 below. An example video decoder will be described by reference to FIG. 11 below.

VIII. Example Video Encoder

Figure 8:
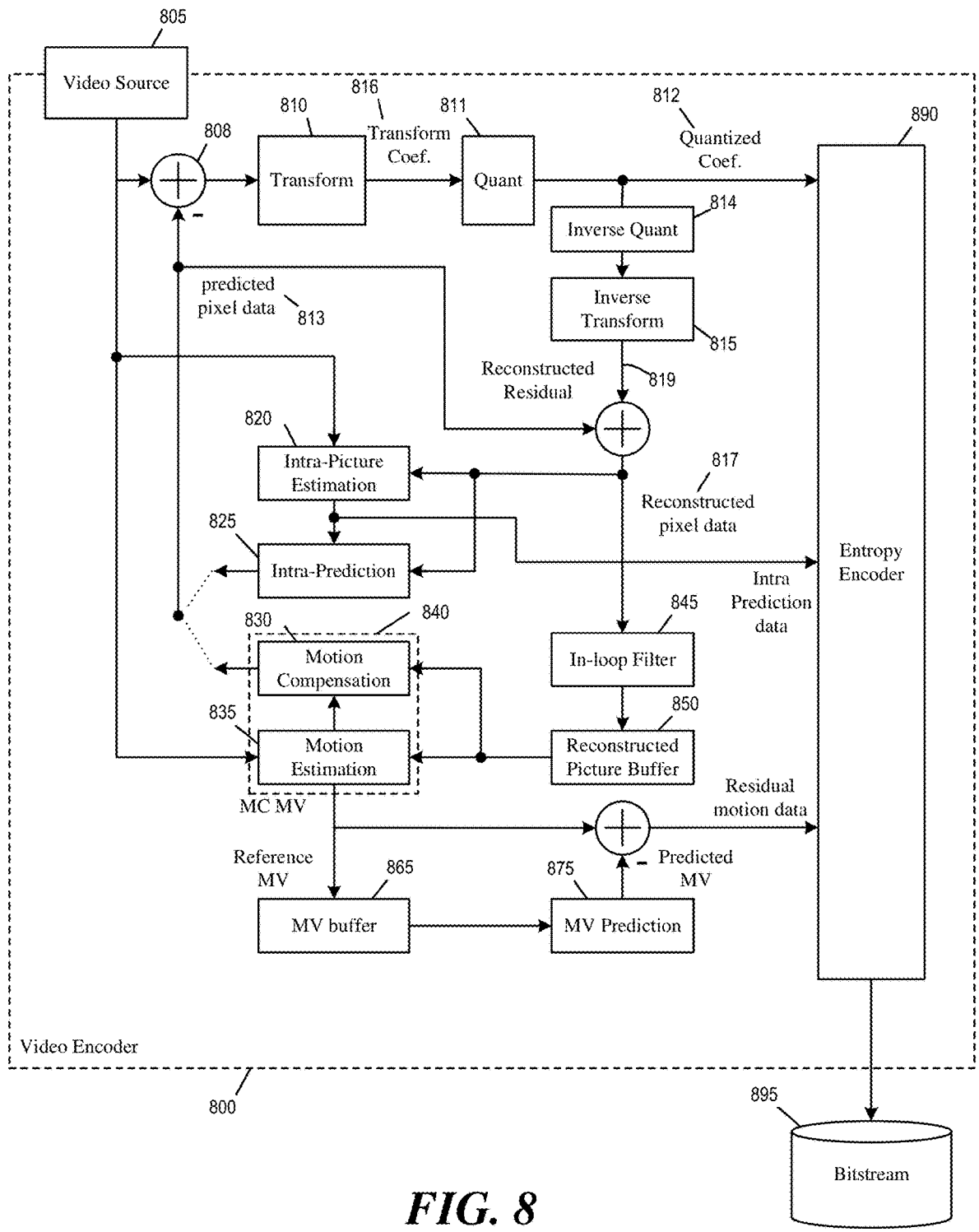
FIG. 8 illustrates an example video encoder that may use implicitly derived transform settings to encode pixel blocks.

FIG. 8 illustrates an example video encoder 800 that may use implicitly derived transform settings to encode pixel blocks. As illustrated, the video encoder 800 receives input video signal from a video source 805 and encodes the signal into bitstream 895. The video encoder 800 has several components or modules for encoding the signal from the video source 805, including a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825. The transform module 810 converts the difference (or the residual pixel data or residual signal 809) into transform coefficients by performing one of several possible transforms, such as DCT-II, DST-VII, DCT-VIII, DST-I, and DCT-V, any other transform types, or any subset of the above transform types. The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819 by performing one of several possible transforms, such as DCT-II, DST-VII, DCT-VIII, DST-I, and DCT-V, any other transform types, or any subset of the above transform types. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
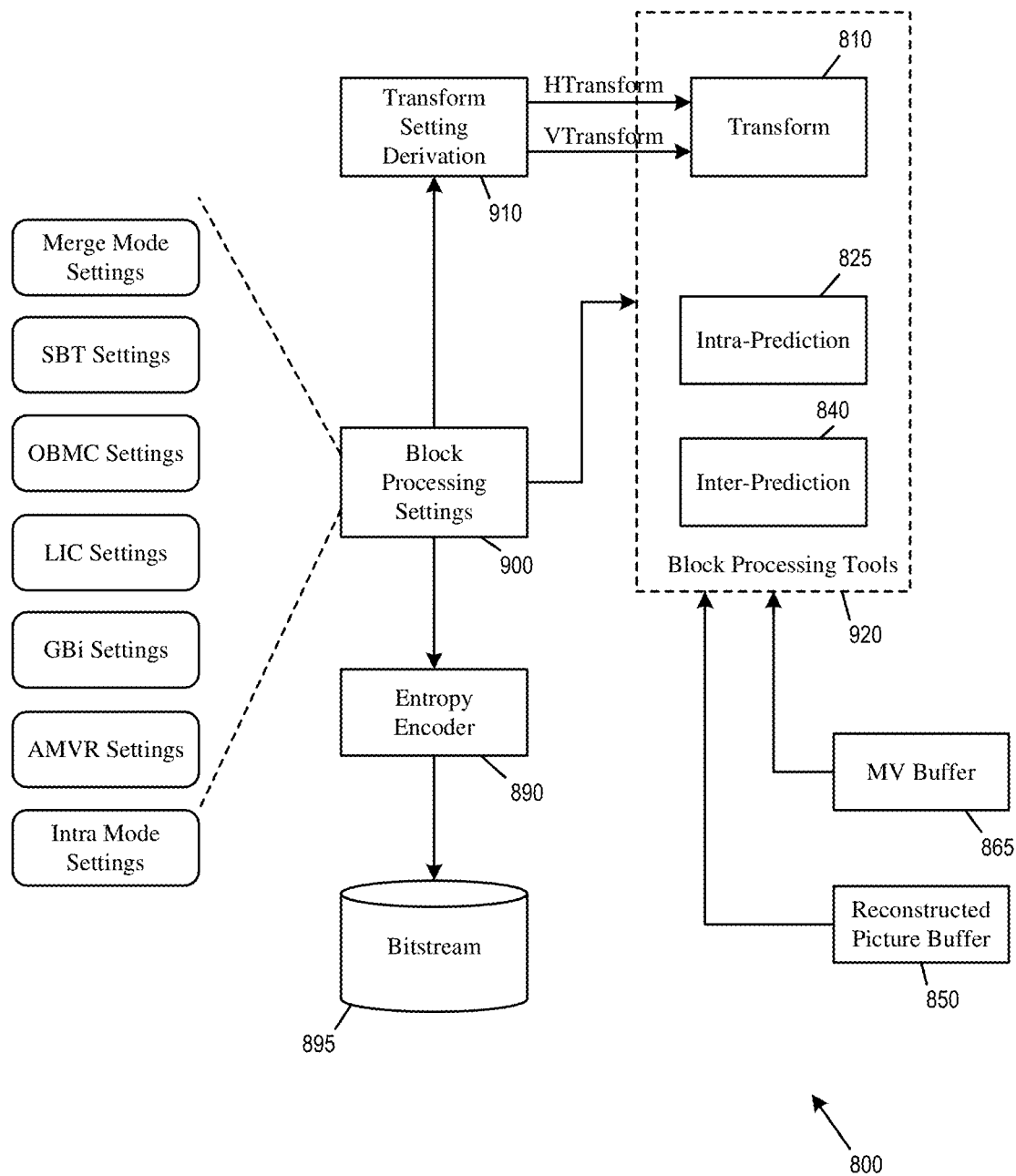
FIG. 9 illustrates portions of the video encoder that implement implicit derivation of transform settings based on block processing settings.

FIG. 9 illustrates portions of the video encoder 800 that implement implicit derivation of transform settings based on block processing settings. As illustrated, a block processing tools 920 includes the inter-prediction module 840, the intra-prediction module 825, the transform module 810, and other components (not illustrated) that process the current block. The block processing tools 920 may reference MVs and pixel data stored in the MV buffer 865 and the reconstructed picture buffer 850. A set of block processing settings 900 control the operations of the block processing tools 920. These block processing settings may include flags and indices for GBi, LIC, OBMC, SBT, AMVR, Merge mode, and Intra Mode. A transform setting derivation module 910 receives the block processing settings 900 and maps the received block processing settings to transform settings for the transform module 810. The transform settings may include a transform mode or transform types for a vertical transform and a horizontal transform. The transform types may be selected from various versions of DCT or DST such as DCT-II, DST-VII, DCT-VIII, DST-I, and DCT-V, or any subset of the above transform types. The transform module 810 in turn performs transform on the prediction residuals of the block based on the derived transform settings.

The entropy encoder 890 also receives the block processing settings 900 and encodes at least some of the block processing settings 900 as syntax element in the bitstream 895. The mapping of the transform settings from the block processing settings is described in Sections I through VII above.

Figure 10:
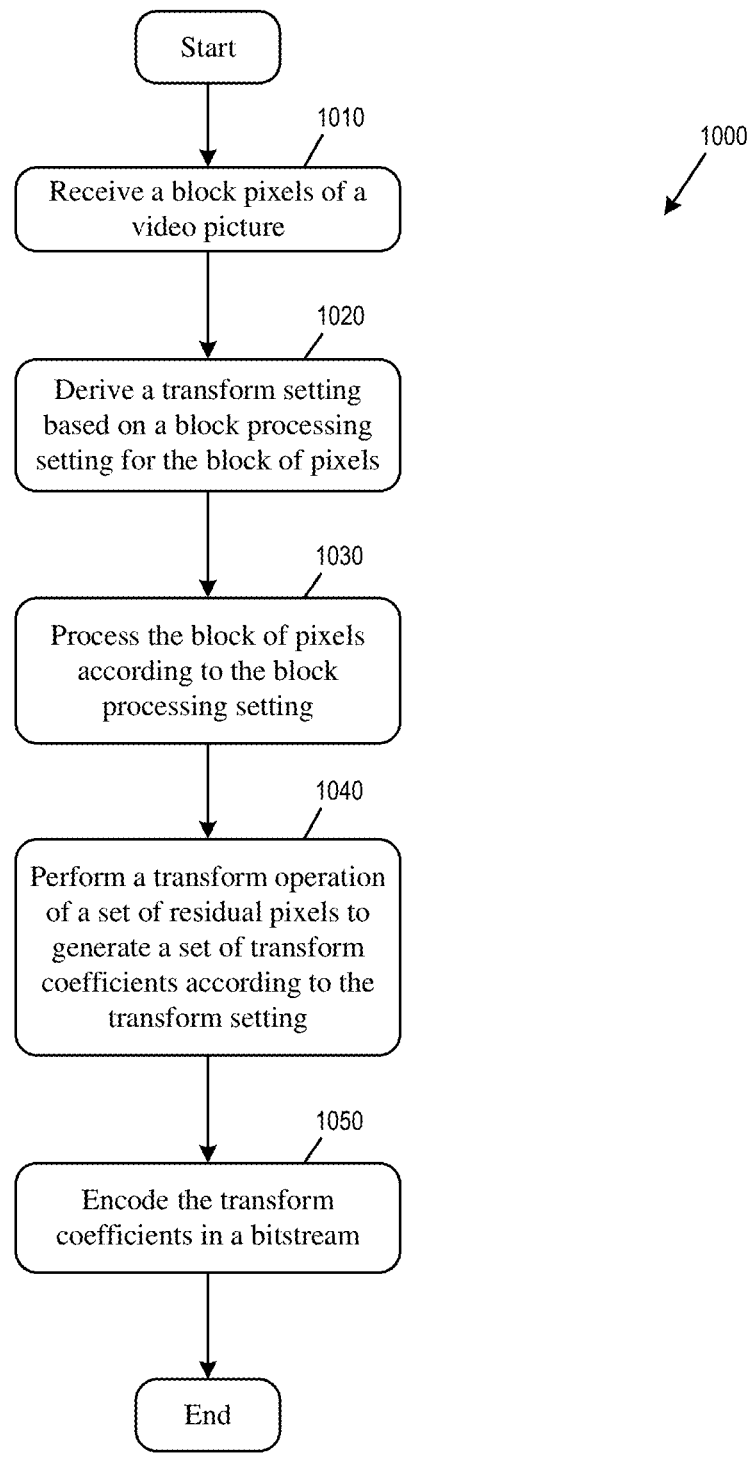
FIG. 10 conceptually illustrates a process for implicitly deriving transform settings based on block processing settings during video encoding.

FIG. 10 conceptually illustrates a process 1000 for implicitly deriving transform settings based on block processing settings during video encoding. In some embodiments, one or more processing units (e.g., a processor) of a computing device implementing the video encoder 800 performs the process 1000 by executing instructions stored in a computer readable medium. In some embodiments, an electronic apparatus implementing the video encoder 800 performs the process 1000.

The video encoder receives (at step 1010) a block of pixels of a video picture from a video source. The video encoder derives (at step 1020) a transform setting based on a block processing setting for the block of pixels. The block processing setting controls block processing operations that include inter-prediction, intra-prediction, GBi, LIC, OBMC, SBT, AMVR, Merge candidate index, merge candidate type, motion candidate direction (uni-prediction or bi-prediction).

The block processing setting may include a flag for enabling one of the block processing operations or an index for selecting a weight for one of the block processing operations, etc. The video coder processes (at step 1030) the block of pixels according to the block processing setting.

The video encoder performs (at step 1040) a transform operation of a set of residual pixels to generate a set of transform coefficients according to the transform setting. In some embodiments, the transform operation is one of the block processing operations controlled by the block processing setting. In some embodiments, the block processing operations may generate a set of prediction pixels that is used to generate the residual pixels for the transform operation. The block processing operations may also modify pixel values of the block. The derived transform setting determines a transform mode of the transform operation. The transform mode may specify a horizontal transform type and/or a vertical transform type. The transform mode or type may be selected from a plurality of different possible transforms, including various versions of DCT or DST.

The video encoder encodes (at step 1050) the transform coefficients as syntax elements in a bitstream. The derived transform setting may not be included in the bitstream as syntax elements.

IX. Example Video Decoder

Figure 11:
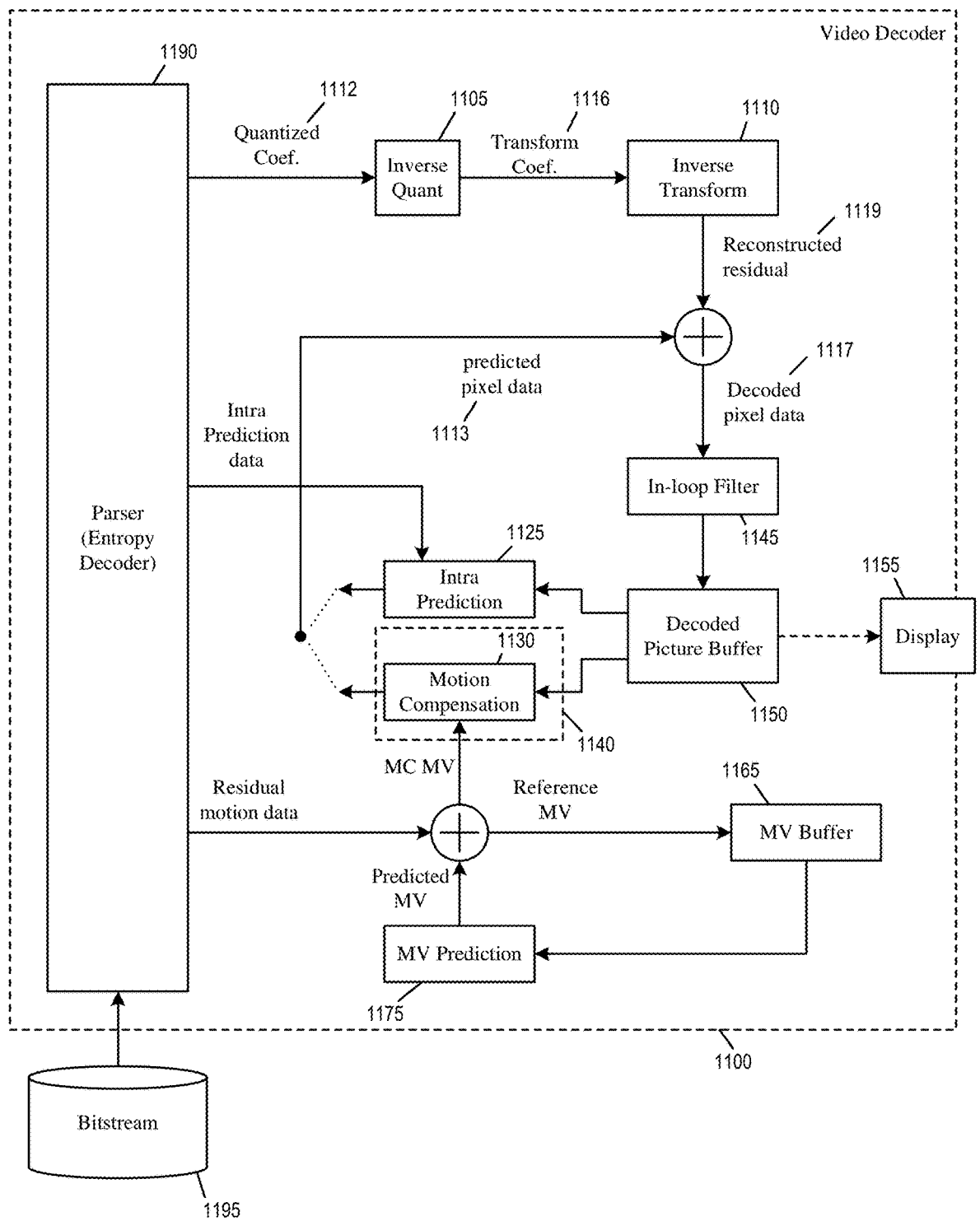
FIG. 11 illustrates an example video decoder that may use implicitly derived transform settings to decode pixel blocks.

FIG. 11 illustrates an example video decoder 1100 that may use implicitly derived transform settings to decode pixel blocks. As illustrated, the video decoder 1100 is an image-decoding or video-decoding circuit that receives a bitstream 1195 and decodes the content of the bitstream into pixel data of video frames for display. The video decoder 1100 has several components or modules for decoding the bitstream 1195, including an inverse quantization module 1105, an inverse transform module 1110, an intra-prediction module 1125, a motion compensation module 1130, an in-loop filter 1145, a decoded picture buffer 1150, a MV buffer 1165, a MV prediction module 1175, and a parser 1190. The motion compensation module 1130 is part of an inter-prediction module 1140.

In some embodiments, the modules 1110-1190 are modules of software instructions being executed by one or more processing units (e.g., a processor) of a computing device. In some embodiments, the modules 1110-1190 are modules of hardware circuits implemented by one or more ICs of an electronic apparatus. Though the modules 1110-1190 are illustrated as being separate modules, some of the modules can be combined into a single module.

The parser 1190 (or entropy decoder) receives the bitstream 1195 and performs initial parsing according to the syntax defined by a video-coding or image-coding standard. The parsed syntax element includes various header elements, flags, as well as quantized data (or quantized coefficients) 1112. The parser 1190 parses out the various syntax elements by using entropy-coding techniques such as context-adaptive binary arithmetic coding (CABAC) or Huffman encoding.

The inverse quantization module 1105 de-quantizes the quantized data (or quantized coefficients) 1112 to obtain transform coefficients, and the inverse transform module 1110 performs inverse transform on the transform coefficients 1116 to produce reconstructed residual signal 1119 by performing inverse transform for one of several possible transforms, such as DCT-II, DST-VII, DCT-VIII, DST-I, and DCT-V. The reconstructed residual signal 1119 is added with predicted pixel data 1113 from the intra-prediction module 1125 or the motion compensation module 1130 to produce decoded pixel data 1117. The decoded pixels data are filtered by the in-loop filter 1145 and stored in the decoded picture buffer 1150. In some embodiments, the decoded picture buffer 1150 is a storage external to the video decoder 1100. In some embodiments, the decoded picture buffer 1150 is a storage internal to the video decoder 1100.

The intra-prediction module 1125 receives intra-prediction data from bitstream 1195 and according to which, produces the predicted pixel data 1113 from the decoded pixel data 1117 stored in the decoded picture buffer 1150. In some embodiments, the decoded pixel data 1117 is also stored in a line buffer (not illustrated) for intra-picture prediction and spatial MV prediction.

In some embodiments, the content of the decoded picture buffer 1150 is used for display. A display device 1155 either retrieves the content of the decoded picture buffer 1150 for display directly, or retrieves the content of the decoded picture buffer to a display buffer. In some embodiments, the display device receives pixel values from the decoded picture buffer 1150 through a pixel transport.

The motion compensation module 1130 produces predicted pixel data 1113 from the decoded pixel data 1117 stored in the decoded picture buffer 1150 according to motion compensation MVs (MC MVs). These motion compensation MVs are decoded by adding the residual motion data received from the bitstream 1195 with predicted MVs received from the MV prediction module 1175.

The MV prediction module 1175 generates the predicted MVs based on reference MVs that were generated for decoding previous video frames, e.g., the motion compensation MVs that were used to perform motion compensation. The MV prediction module 1175 retrieves the reference MVs of previous video frames from the MV buffer 1165. The video decoder 1100 stores the motion compensation MVs generated for decoding the current video frame in the MV buffer 1165 as reference MVs for producing predicted MVs.

The in-loop filter 1145 performs filtering or smoothing operations on the decoded pixel data 1117 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 12:
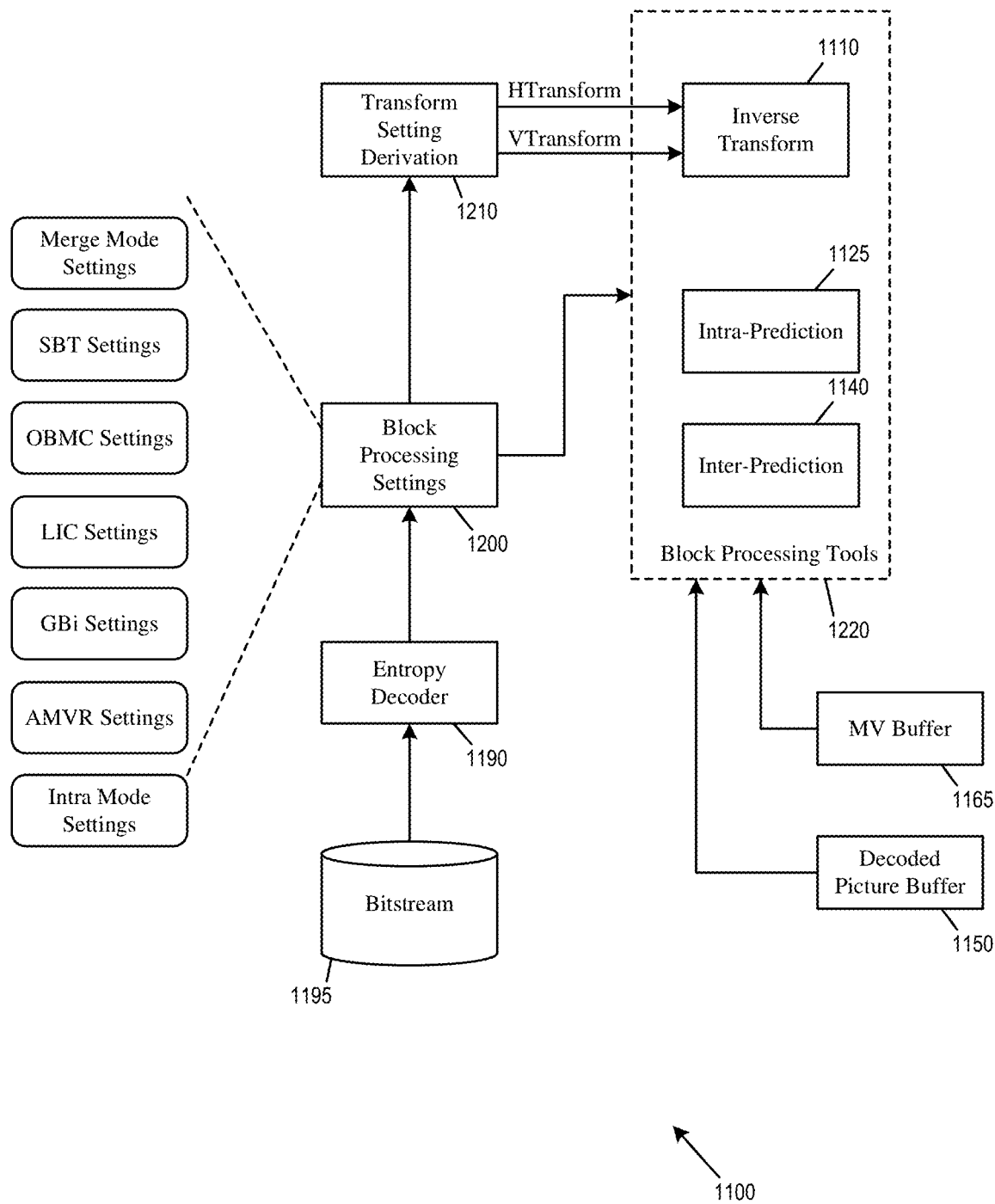
FIG. 12 illustrates portions of the video decoder that implement implicit derivation of transform settings based on block processing settings.

FIG. 12 illustrates portions of the video decoder 1100 that implement implicit derivation of transform settings based on block processing settings. As illustrated, a block processing tools 1220 includes the inter-prediction module 1140, the intra-prediction module 1125, the inverse transform module 1110, and other components (not illustrated) that process the current block. The block processing tools 1220 may reference MVs and pixel data stored in the MV buffer 1165 and the decoded picture buffer 1150. A set of block processing settings 1200 control the operations of the block processing tools 1220. These block processing settings may include flags and indices for GBi, LIC, OBMC, SBT, AMVR, Merge mode, and Intra Mode. A transform setting derivation module 1210 receives the block processing settings 1200 and maps the received block processing settings to transform settings for the inverse transform module 1110. The transform settings may include a transform mode or transform types for a vertical transform and a horizontal transform. The transform types may be selected from various versions of DCT or DST such as DCT-II, DST-VII, DCT-VIII, DST-I, and DCT-V. The inverse transform module 1110 in turn performs inverse transform to reconstruct the residuals 1119 of the block based on the derived transform settings.

A transform setting derivation module 1210 receives the block processing settings 1200 and maps them to a transform mode for the inverse transform module 1110. The transform mode may specify a vertical transform and a horizontal transform. The vertical and horizontal transforms may be selected from transform types such as DCT-II, DST-VII, DCT-VIII, DST-I, and DCT-V. The block processing settings 1200 are parsed out from the bitstream 1195 by the entropy decoder 1190 as syntax elements. The mapping of the transform settings from the block processing settings is described in Sections I through VII above.

Figure 13:
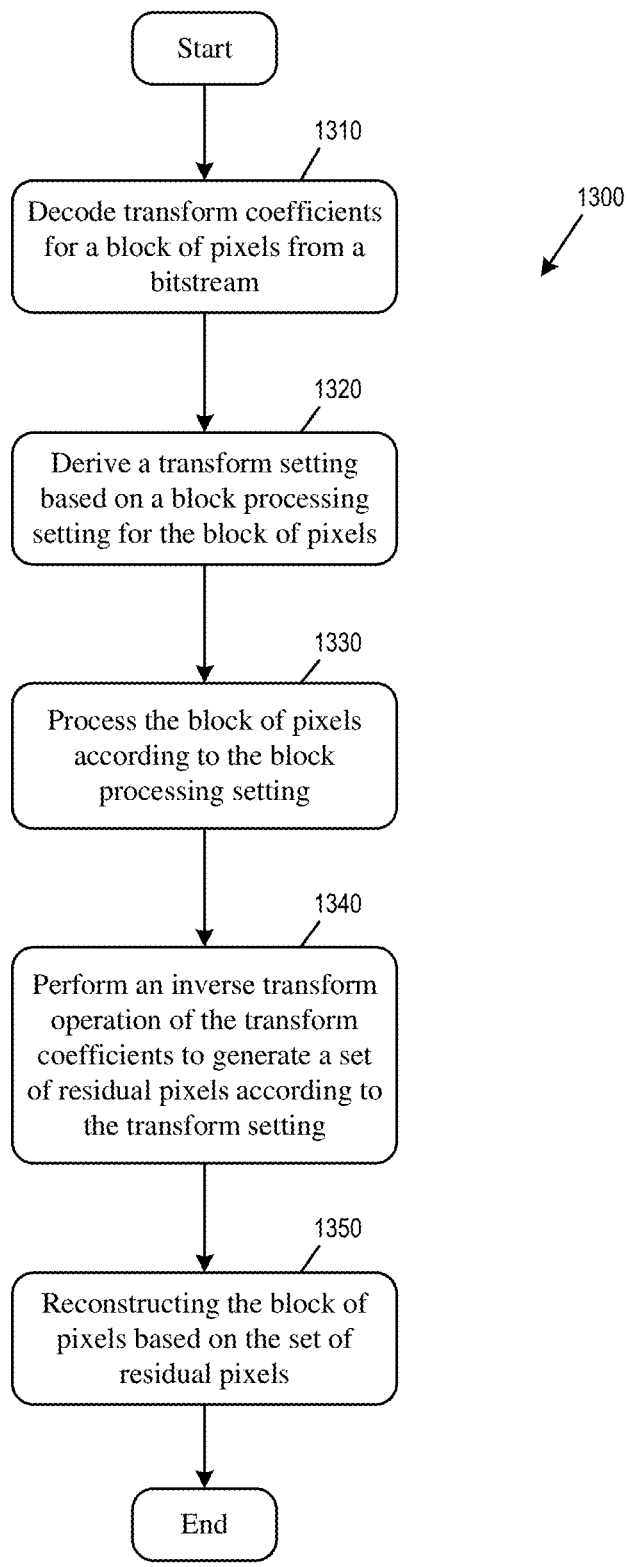
FIG. 13 conceptually illustrates a process for implicitly deriving transform settings based on block processing settings during video decoding.

FIG. 13 conceptually illustrates a process 1300 for implicitly deriving transform settings based on block processing settings during video decoding. In some embodiments, one or more processing units (e.g., a processor) of a computing device implementing the video decoder 1100 performs the process 1300 by executing instructions stored in a computer readable medium. In some embodiments, an electronic apparatus implementing the video decoder 1100 performs the process 1300.

The video decoder decodes (at step 1310) transform coefficients for a block of pixels from syntax elements of a bitstream. The video decoder derives (at step 1320) a transform setting based on a block processing setting for the block of pixels. The block processing setting controls block processing operations that include inter-prediction, intra-prediction, GBi, LIC, OBMC, SBT, AMVR, Merge candidate index, merge candidate type, motion candidate direction (uni-prediction or bi-prediction). The block processing setting may include a flag for enabling one of the block processing operations or an index for selecting a weight for one of the block processing operations, etc. The video decoder processes (at step 1330) the block of pixels according to the block processing setting.

The video decoder performs (at step 1340) an inverse transform operation of the transform coefficients to generate a set of residual pixels according to the transform setting. In some embodiments, the inverse transform operation is one of the block processing operations controlled by the block processing setting. The block processing operations may also modify pixel values of the block. The derived transform setting determines a transform mode of the inverse transform operation. The transform mode may specify a horizontal transform type and/or a vertical transform type. The transform mode or type may be selected from a plurality of different possible transforms, including various versions of DCT or DST.

The video decoder reconstructs (at step 1350) the block of pixels based on the set of residual pixels. In some embodiments, the residual pixels generated by the inverse transform operation is combined with a set of prediction pixels generated by the block processing operations in order to reconstruct the block of pixels. The decoded pixels may be displayed, transmitted, or stored.

X. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
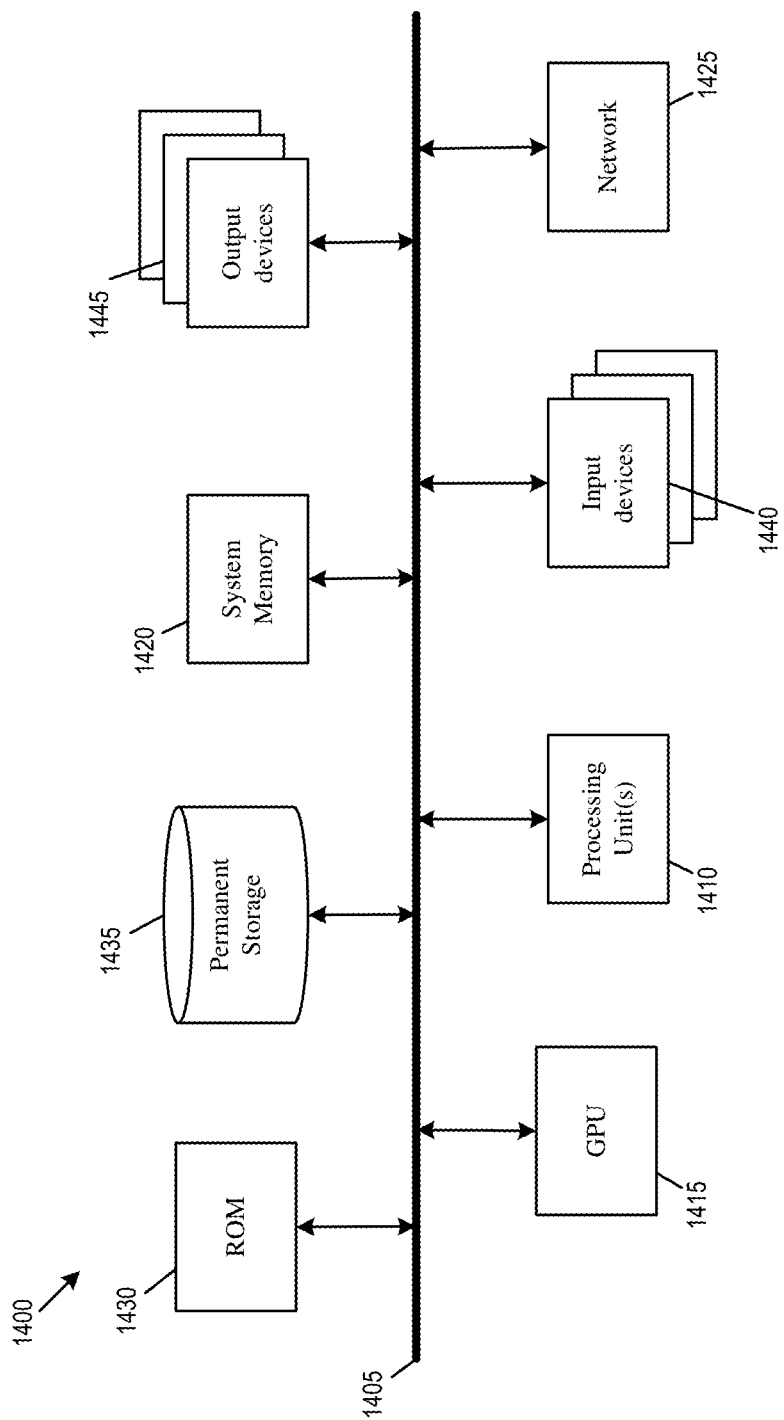
FIG. 14 conceptually illustrates an electronic system with which some embodiments of the present disclosure are implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are used by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor uses at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alpha-numeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people.

For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 10 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A decoding method comprising:
   decoding transform coefficients for a block of pixels coded by inter mode from a bitstream;
   deriving a transform setting based on a block processing setting for the block of pixels;
   processing the block of pixels according to the block processing setting, wherein processing the block of pixels comprises performing an inverse transform operation for the transform coefficients to generate a set of residual pixels according to the transform setting; and
   reconstructing the block of pixels based on the set of residual pixels,
   wherein the block processing setting controls a Sub-Block Transform (SBT) operation that partitions the block of pixels into a plurality of sub-blocks and performs transform for a particular sub-block in the plurality of sub-blocks, wherein the block processing setting comprises an orientation of the partitioning of the block, a width or height of the block, and a position of the transformed sub-block, wherein the orientation of the partitioning of the block is one of a vertical splitting orientation and a horizontal splitting orientation, wherein deriving the transform setting comprises selecting a transform mode from a plurality of transform modes based on the block processing setting, wherein the plurality of transform modes are from a set of transform types that includes at least two transform types, and wherein when the vertical splitting orientation is used, the position is used to determine a transform type from the set of transform types for a horizontal transform, and when the horizontal splitting orientation is used, the position is used to determine the transform type for a vertical transform.

2. The method of claim 1, wherein the transform setting comprises a target transform mode that is selected from a plurality of candidate transform modes based on the block processing setting for the block of pixel.

3. The method of claim 2, wherein a target transform group is selected from at least one first group and at least one second group based on a transform flag, the plurality of candidate transform modes belongs to either the first group or the second group, the target transform mode is selected from the candidate transform modes belonging to the target transform group.

4. The method of claim 3, wherein the transform flag is parsed from the bitstream or determined according to the block processing setting.

5. The method of claim 2, wherein the target transform mode is determined according to an index derived from the bitstream or the block processing setting.

6. The method of claim 2, wherein at least one of the candidate transform modes comprises a transform type for horizontal transform and a transform type for vertical transform.

7. The method of claim 1, wherein the transform setting is not included in the bitstream as a syntax element.

8. The method of claim 1, wherein the block processing setting controls a Generalized Bi-prediction (GBi) operation that applies different weights for different predictors when producing a set of prediction pixels, wherein the block processing setting comprises a weight selection index for selecting a weight for a predictor, and wherein deriving the transform setting comprises selecting a transform mode from a plurality of transform modes based on the weight selection index.

9. The method of claim 1, wherein the block processing setting controls a Local Illumination Compensation (LIC) operation that uses neighboring samples of the block of pixels and neighboring samples of a reference block of pixels to apply an illumination adjustment to the block of pixels, wherein the block processing setting comprises a LIC flag for enabling the LIC operation, and wherein deriving the transform setting comprises selecting a transform mode from a plurality of transform modes based on the LIC flag.

10. The method of claim 1, wherein the block processing setting controls an inter-prediction operation, wherein the block processing setting comprises an Advance Motion Vector Resolution (AMVR) operation that switches a resolution of a motion vector difference between a motion vector and a motion predictor of the block of pixels with a resolution selection index for selecting a resolution for the motion vector difference, and wherein deriving the transform setting comprises selecting a transform mode from a plurality of transform modes based on the resolution selection index.

11. The method of claim 1, wherein the block processing setting controls an Overlapped Block Motion Compensation (OBMC) operation for smoothing boundaries between partitions of the block of pixels using different motion vectors, wherein the block processing setting comprises a OBMC flag for enabling the OBMC operation, and wherein deriving the transform setting comprises selecting a transform mode from a plurality of transform modes based on the OBMC flag.

12. The method of claim 1, wherein the block processing setting controls an inter-prediction operation, wherein the block processing setting comprises a merge candidate index that selects one of a set of one or more Merge candidates, and wherein deriving the transform setting comprises selecting a transform mode from a plurality of transform modes based on the merge index.

13. The method of claim 1, wherein the block processing setting controls a prediction direction of a motion candidate, and wherein deriving the transform setting comprises selecting a transform mode from a plurality of transform modes based on the prediction direction.

14. The encoding method of claim 1, wherein the transform setting specifies whether the SBT operation is applied or not.

15. An encoding method comprising:
receiving a block of pixels coded by inter mode of a video picture;
deriving a transform setting based on a block processing setting for the block of pixels;
processing the block of pixels according to the block processing setting, wherein processing the block of pixels comprises performing a transform operation of a set of residual pixels to generate a set of transform coefficients according to the transform setting; and
encoding the transform coefficients in a bitstream,
wherein the block processing setting controls a Sub-Block Transform (SBT) operation that partitions the block of pixels into a plurality of sub-blocks and performs transform for a particular sub-block in the plurality of sub-blocks, wherein the block processing setting comprises an orientation of the partitioning of the block, a width or height of the block, and a position of the sub-block that is being transformed, wherein the orientation of the partitioning of the block is one of a vertical splitting orientation and a horizontal splitting orientation, and wherein deriving the transform setting comprises selecting a transform mode from a plurality of transform modes based on the block processing setting, wherein the plurality of transform modes are from a set of transform types that includes at least two transform types, and wherein when the vertical splitting orientation is used, the position is used to determine a transform type from the set of transform types for a horizontal transform, and when the horizontal splitting orientation is used, the position is used to determine the transform type for a vertical transform.

16. An encoding method comprising:
receiving a block of pixels coded by inter mode of a video picture;
deriving a transform setting based on a block processing setting and one of a height or a width of the block of pixels, an orientation of a partitioning of the block, and a position of a sub-block that is being transformed, wherein the orientation of the partitioning of the block is one of a vertical splitting orientation and a horizontal splitting orientation, wherein deriving the transform setting comprises selecting a transform mode from a plurality of transform modes based on the block processing setting, wherein the plurality of transform modes are from a set of transform types that includes at least two transform types, wherein when the vertical splitting orientation is used, the position is used to determine a transform type from the set of transform types for a horizontal transform, and when the horizontal splitting orientation is used, the position is used to determine the transform type for a vertical transform;

when at least one of the height or the width of the block of pixels is less than a threshold, implicitly assigning a transform setting in a corresponding one of a horizontal or a vertical transform set based on a predetermined table;

performing a transform operation of the block of pixels to generate a set of transform coefficients according to the transform setting; and encoding the transform coefficients in a bitstream.

17. A decoding method comprising:

decoding transform coefficients for a block of pixels coded by inter mode of a video picture from a bitstream;

deriving a transform setting based on a block processing setting and one of a height or a width of the block of pixels, an orientation of a partitioning of the block, and a position of a transformed sub-block, wherein the orientation of the partitioning of the block is one of a vertical splitting orientation and a horizontal splitting orientation, wherein deriving the transform setting comprises selecting a transform mode from a plurality of transform modes based on the block processing setting, wherein the plurality of transform modes are from a set of transform types that includes at least two transform types, wherein when the vertical splitting orientation is used, the position is used to determine a transform type from the set of transform types for a horizontal transform, and when the horizontal splitting orientation is used, the position is used to determine the transform type for a vertical transform;

when at least one of the height or the width of the block of pixels is less than a threshold, implicitly assigning a transform setting in a corresponding one of a horizontal or a vertical transform set based on a predetermined table;

performing an inverse transform operation for the transform coefficients to generate a set of residual pixels according to the transform setting; and reconstructing the block of pixels based on the set of residual pixels.

18. The method of claim 1, wherein deriving the transform setting further comprises selecting the transform mode from the plurality of transform modes based on a temporal layer, and a control flag at one of a slice level and a picture level.

19. The method of claim 16, wherein when at least one of the height or the width of the block of pixels is less than the threshold, implicitly assigning the transform setting in the corresponding one of the horizontal or the vertical transform set based on the predetermined table having a fixed equation (Generalized Bi-prediction (GBi) index % N=n), where N and n are predetermined integers where even-number GBi indices are implicitly mapped to a first transform group and odd-number GBi indices are implicitly mapped to second transform group.

20. The method of claim 1, wherein the vertical splitting orientation and the horizontal splitting orientation vary with the width and/or height of the block, respectively.

21. The method of claim 1, wherein the position is explicitly parsed or signaled from or in the bitstream.

* * * * *